J. E. BASTER.
TRACTOR.
APPLICATION FILED MAY 10, 1919.

1,331,088.

Patented Feb. 17, 1920.
2 SHEETS—SHEET 1.

Inventor
Joseph E. Baster
By Fred E. Billman Atty.

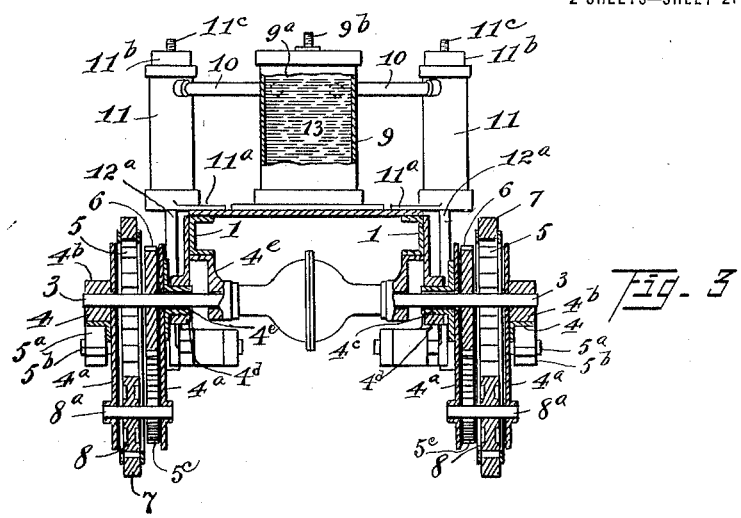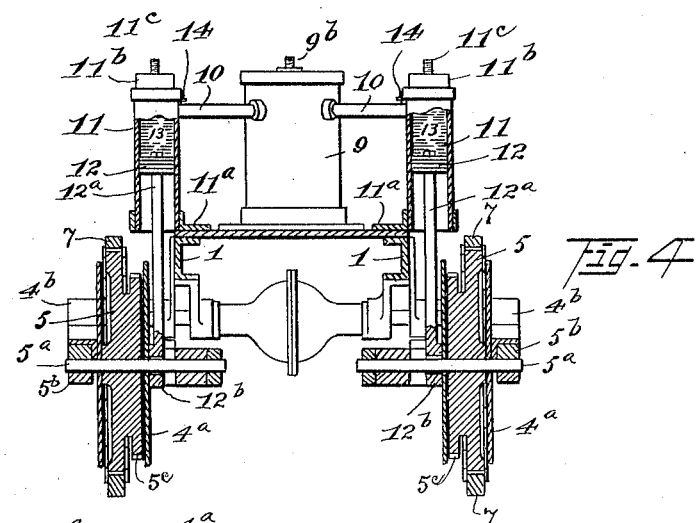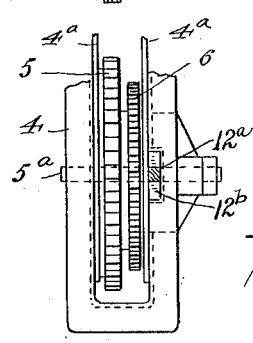

UNITED STATES PATENT OFFICE.

JOSEPH E. BASTER, OF CLEVELAND, OHIO.

TRACTOR.

1,331,088.      Specification of Letters Patent.      Patented Feb. 17, 1920.

Application filed May 10, 1919. Serial No. 296,122.

*To all whom it may concern:*

Be it known that I, JOSEPH E. BASTER, a citizen of the United States, residing at Cleveland, in the county of Cuyahoga and State of Ohio, have invented certain new and useful Improvements in Tractors, of which the following is a specification.

My invention relates to improvements in tractors, and more particularly to that class or type known as "caterpillar" tractors, in which the tractor units or side members are provided with driving and supporting wheels arranged within and adapted to drive endless tractor members or "self-laying" track belts and adapted to be driven and guided by mechanism such as shown and described and claimed in my application for improvements in tractors, filed February 26th, 1919, Serial No. 279,318. While the improvements are particularly designed and adapted in the present embodiment for use in connection with tractors of the type indicated it is, of course, obvious that the improved suspension mechanism for resisting and cushioning the caterpillar units or members may be applied to tractors of varying forms and types.

A further and very important object of the invention is the provision of improved means for flexibly and resiliently mounting the caterpillar and tractor units to the tractor frame or chassis in independent relation to each other, thereby enabling the respective tractor units to pass over and absorb obstructions on either side without materially changing the position of the motor chassis or disturbing or impairing the ground gripping position of the opposite tractor unit.

A still further object is the provision of improved fluid resisted piston or plunger members extending between the tractor chassis and the vertically movable ends of the caterpillar members or units and flexibly connected to the latter, whereby an improved suspension device is provided.

A still further object is the provision of improved means for regulating the sensitiveness of the caterpillar fluid resisted suspension means, whereby the same may be readily adjusted to meet the varying exigencies of actual service.

With the above mentioned and other ends in view, the invention consists in the novel construction, arrangement and combination of parts, hereinafter described, illustrated in one of its embodiments in the accompanying drawings, and particularly pointed out in the appended claims.

Figure 1:
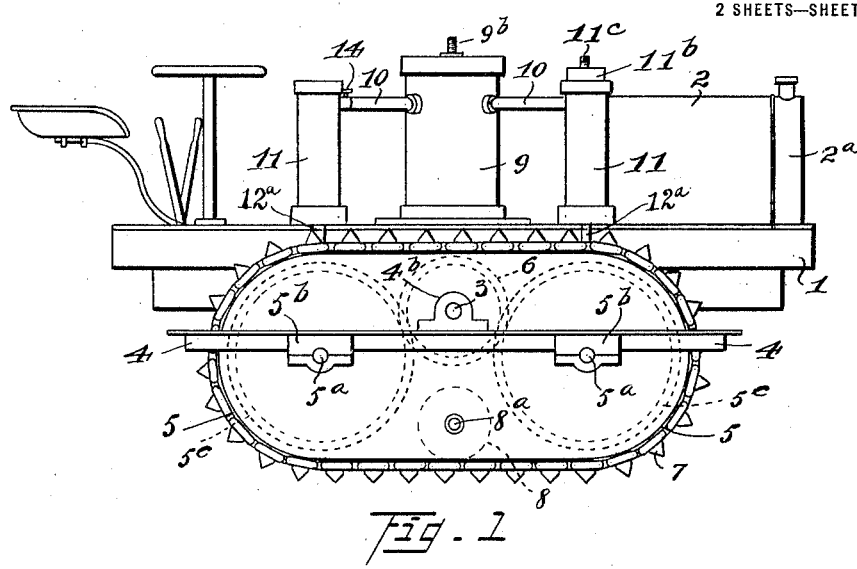

Referring to the drawings, forming a part of this specification, Figure 1, is a side elevation of a tractor of the caterpillar type equipped with fluid actuated suspension mechanism constructed in accordance with this invention, and embodying my improved means for mounting and supporting the caterpillar tractors or members.

Figure 2:
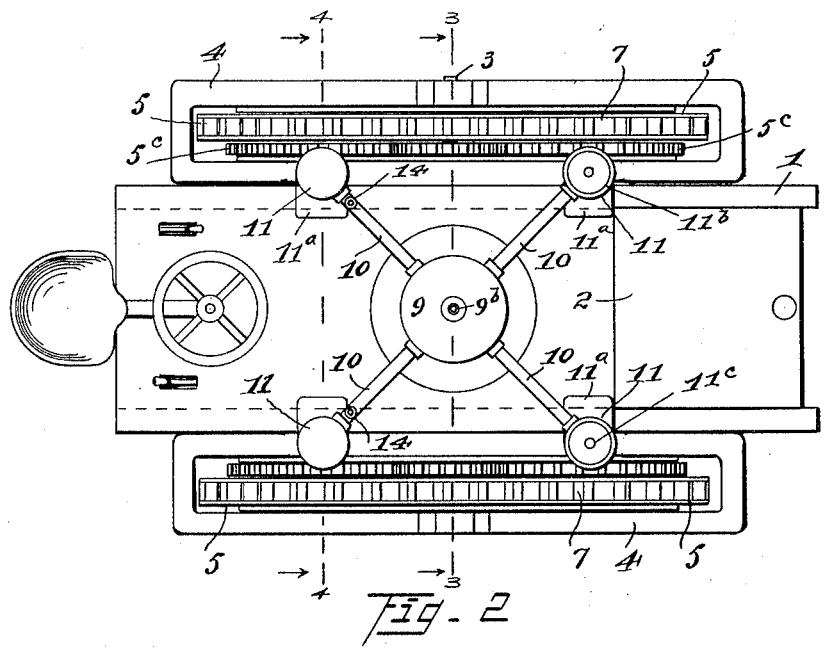

Fig. 2, a top plan view of the same.

Fig. 3, a cross sectional view, taken on line 3—3 of Fig. 2.

Fig. 4, a cross sectional view, taken on line 4—4, of Fig. 2.

Fig. 5, an enlarged fragmentary top plan view of one of the plunger connections with the caterpillar frame or unit.

Similar numerals of reference designate like parts thoughout all the figures of the drawings.

The improved tractor comprises a suitable tractor frame or chassis 1, provided with suitable cross supports adapted to give strength to the tractor frame, as a whole, and to properly support the various parts and the operating mechanism therefor.

The improved means for independently driving and controlling the caterpillar members or units, together with improved gear and gear shift mechanism between such tractor units and the prime mover or motor, whereby such tractor units may not only be driven simultaneously in forward and rearward directions, but may also be driven either singly in either direction or simultaneously in opposite directions, as in guiding or making short turns is fully described and claimed in my application hereinbefore referred to, and forming no part of the present invention need not be described in detail.

The frame or chassis 1, is provided with a suitable prime mover or motor 2, of any suitable and convenient form, said motor, in the present instance, being provided with a suitable radiator 2$^a$.

The crank shaft of the motor, through the medium of a suitable friction clutch (not shown) and suitable transmission mechanism, described and claimed in said pending application for Letters Patent, communicates motion to each caterpillar traction member or unit through the medium of a suitable axle driving shaft, said caterpillar traction member or unit being constructed and arranged as hereinafter described.

Referring now to the improved caterpillar traction members or units and the improved means for flexibly and resiliently mounting the same to the tractor frame or chassis in independent relation to each other, and to which this invention particularly relates, it will be seen upon reference to the drawings that each caterpillar traction member or unit is pivotally mounted and driven from an axle driving shaft 3, receiving its motion from adjacent driving mechanism of the transmission means, so that each axle driving shaft and the caterpillar mechanism connected therewith may be independently driven for the purposes herebefore referred to.

Each caterpillar tractor member comprises a main rectangular shaped frame member 4, and side plates $4^a$, carried by and pivotally mounted on the respective axle driving shafts 3. The side plates $4^a$, are adapted to exclude dirt and foreign substances from the internal caterpillar mechanism and are provided with suitable openings receiving the axle driving shafts 3, and the main caterpillar frame 4, is provided with bearings $4^b$, and $4^c$, the bearing $4^c$, being in the specific form of a bushing member adapted to rotate in a bearing member $4^d$, on the chassis frame.

Each caterpillar frame, including the main frame 4, and side plates $4^a$, is provided with a pair of carrying wheels 5, mounted on suitable bearing shafts $5^a$, the latter being preferably keyed to the carrying wheels 5, and being mounted on the main frame 4, by means of suitable bearing blocks $5^b$. The caterpillar carrying wheels 5, are adapted to receive their motion from an intermediate driving gear 6, fixed upon the axle driving shaft 3, through the medium of gear members $5^c$, meshing with the intermediate driving gear 6.

The forward carrying wheel 5, is preferably provided with teeth (not shown) to receive and coöperate with the links of the endless tractor member or link belt 7, substantially as shown in my pending application above referred to, and the lower or intermediate portion of each caterpillar frame is preferably provided with a tension or friction roller 8, (see Fig. 1) adapted to bear upon the lower pass of the endless tractor member and mounted on a bearing member $8^a$, extending, in the present instance, between the side frame plates $4^a$.

Referring now to the improved fluid actuated suspension mechanism to which this invention particularly relates whereby the caterpillar tractor units are flexibly and resiliently mounted and connected to the tractor frame or chassis in independent relation to each other, it will be seen that I provide a main receptacle or cylinder 9, suitably mounted on the tractor body or chassis, said receptacle being closed and forming a main chamber $9^a$, adapted to contain the operating fluid, and the upper portion of said receptacle or vessel being provided with conduit pipes 10, communicating with piston cylinders 11, the latter being preferably arranged in an upright position above the free or vertically movable ends of the tractor members, and preferably immediately above the bearing shafts $5^a$, of the carrying wheels 5, and secured to the tractor body or chassis in any suitable and convenient manner, said mounting or connection, in the present instance, comprising supporting brackets $11^a$. The piston cylinders 11, are each provided with vertically movable pistons 12, provided with piston stems or rods $12^a$, the latter terminating at the lower ends in bearing heads $12^b$, mounted on the bearing shaft $5^a$, thereby providing a flexible connection and cushioning the ends of the caterpillar frames in their oscillatory movements on the axle driving shafts and relative to the tractor chassis.

As a means of resisting the action of the piston or plunger members 12, the main receptacle or cylinder 9, and the piston cylinders 11, are preferably filled with an operating fluid in the specific form of water or oil 13, to a point somewhat above the conduits 10, and the main receptacle or cylinder 9, is preferably provided at its top above the liquid 13, with compressed air through the medium of the filling nozzle $9^b$, and the front piston cylinders 11, are also provided at their tops with air receptacles $11^b$, adapted to be filled with compressed air through the nozzles $11^c$.

As a means of regulating the sensitiveness of the caterpillar members in their oscillation about the axle driving shaft 3, and as controlled by the piston plunger members, the rear conduits 10, communicating with the rear piston cylinders are provided with valves 14, which may be adjusted to more or less open or close the conduits communicating therewith and thereby lessen or increase the resistance offered by the operating fluid in its passage through the conduits 10, and through the respective main receptacle 9, and piston cylinders 11.

From the foregoing description, taken in connection with the accompanying drawings, the operation and advantages of my invention will be readily understood.

Having thus described one of the embodiments of my invention, what I claim and desire to secure by Letters Patent, is,—

1. In a tractor, a main reservoir provided with an air chamber, and piston cylinders having conduits communicating with said reservoir below said air chamber, some of said cylinders being provided with air chambers above said conduits.

2. In a tractor, a chassis frame, tractor members centrally pivoted at the sides thereof, a fluid chamber on said chassis frame, piston cylinders communicating with said fluid chamber, means for adjusting the communication between some of said piston cylinders and said fluid chamber, and pistons mounted in said piston cylinders and operatively connected to said tractor members.

3. In a tractor, a tractor chassis, caterpillar tractor members pivoted on said tractor chassis, a fluid tank provided with communicating conduits and piston cylinders, some of said piston cylinders being provided with air chambers and all having pistons operatively connected to the opposite ends of said caterpillar tractor members for resisting the movements of the latter.

4. In a tractor, a tractor chassis, caterpillar tractor members movable on said tractor chassis, a fluid tank provided with an air chamber on said tractor chassis, piston cylinders provided with conduits communicating with said fluid tank below said air chamber, air chambers in the upper portions of said piston cylinders above said conduits, some of said conduits being provided with valves to regulate the resistance offered to the passage of the operating fluid, and pistons in said piston cylinders operatively connected to said caterpillar tractor members.

5. In a tractor, a tractor body, caterpillar tractor members pivotally mounted at the sides of said body, carrying wheels provided with bearing shafts mounted in said members, endless tractor members on said wheels, piston cylinders on said tractor body above said bearing shafts, pistons in said cylinders provided with piston rods flexibly connected to said bearing shafts, a fluid tank provided with conduits communicating with all of said piston cylinders, an air chamber in said fluid tank above said conduits, air chambers in some of said piston cylinders above said conduits, and valves in the conduits communicating with the other of said piston cylinders and adapted to regulate the flow of fluid therethrough.

In testimony whereof I have affixed my signature.

JOSEPH E. BASTER.